US006609432B2

(12) United States Patent
Kume
(10) Patent No.: US 6,609,432 B2
(45) Date of Patent: Aug. 26, 2003

(54) LOAD SENSOR, PINCH DETECTION APPARATUS AND LOAD DETECTION APPARATUS

(75) Inventor: Masahiro Kume, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/029,263

(22) Filed: Dec. 28, 2001

(65) Prior Publication Data

US 2002/0088283 A1 Jul. 11, 2002

(30) Foreign Application Priority Data

Jan. 9, 2001 (JP) ....................................... 2001-001475

(51) Int. Cl.[7] .............................. G01L 1/00; G01L 5/00

(52) U.S. Cl. .............................. 73/862.391; 73/862.381

(58) Field of Search ................... 73/849, 781, 862.454, 73/862.46, 862.471, 862.671, 862.637, 862.641, 862.642

(56) References Cited

U.S. PATENT DOCUMENTS

| | | | | |
|---|---|---|---|---|
| 2,132,685 A | | 10/1938 | Hampton et al. | |
| 4,060,705 A | | 11/1977 | Peachey | |
| 4,762,970 A | | 8/1988 | Brinsley | |
| 5,186,043 A | * | 2/1993 | Yamaoka et al. | 73/118.1 |
| 5,652,395 A | * | 7/1997 | Hirano et al. | 73/849 |
| 5,926,584 A | * | 7/1999 | Motzko et al. | 385/13 |
| 5,969,268 A | * | 10/1999 | Sommerfeld et al. | 73/862.041 |

FOREIGN PATENT DOCUMENTS

| | | |
|---|---|---|
| DE | 482 283 | 9/1929 |
| JP | 10-281906 | 10/1998 |
| JP | A 10-281906 | 10/1998 |

* cited by examiner

*Primary Examiner*—Edward Lefkowitz
*Assistant Examiner*—Andre Allen
(74) *Attorney, Agent, or Firm*—Oliff & Berridge PLC

(57) ABSTRACT

A load sensor is formed of first and second opposing electrode members. The members make contact to mutually conduct electrically when a load is applied to the load sensor. The first electrode member consists of an elastic tube having at least a part of the circumferential segment formed into a conductive portion. The second electrode member consists of a flexible center electrode with conductivity on at least the outer circumferential portion positioned inside the elastic tube of the first electrode member so that the conducting surfaces face each other. An insulating linear member is wound around the center electrode at a predetermined winding distance.

12 Claims, 3 Drawing Sheets

LOAD SENSOR, PINCH DETECTION APPARATUS AND LOAD DETECTION APPARATUS

BACKGROUND OF THE INVENTION

1. Technical Field

The present invention relates to a load sensor, a pinch detection apparatus and a load detection apparatus.

2. Prior Art

As a conventional load sensor, there is a load sensor described in the Unexamined Japanese Patent Application Publication No. Hei10-281906. As shown in FIG. 10, this load sensor is formed by forming an air gap 1*a* extending in a longitudinal direction inside an elongated-shaped elastic insulator 1 and burying plural electrode wires 3A to 3D spaced in a circumferential direction inside a wall thickness of the elastic insulator 1L . The plural electrode wires 3A to 3D are buried so as to twist the wires together spirally around the air gap 1*a*, and a part of a circumferential segment of the outer circumferential surface is exposed to the air gap 1*a*. Then, when the elastic insulator 1 is elastically deformed so as to squeeze the air gap 1*a* by application of a load, it is constructed so that the electrode wires 3A to 3D make contact mutually to conduct and a load is detected.

As a manufacturing method of this load sensor, there is proposed a method for making a twisted wire by twisting a spacer with the same shape as the air gap 1*a* and the plural electrode wires 3A to 3D together and covering the twisted wire with the elastic insulator 1 and then making the load sensor by pulling the spacer.

Problems to be Solved

However, in the conventional load sensor described above, due to its structure, there is a problem that complicated manufacturing processes of twisting of the spacer and the electrode wires 3A to 3D and subsequent pulling of the spacer are required and the cost is high.

Also, since means for actively separating the electrode wires 3A to 3D mutually to insulate them is not provided, there is also a problem that in the case of bending and placing the load sensor, the electrode wires 3A to 3D accidentally make contact in its bent portion and false detection may occur.

Therefore, in view of the problems, a first object of the invention is to provide a load sensor in which a structure is simple and manufacture can be performed easily at low cost, and a pinch detection apparatus and a load detection apparatus using the load sensor.

Also, a second object of the invention is to provide a load sensor capable of functioning properly even in the case of bending and placing at a large curvature, and a pinch detection apparatus and a load detection apparatus using the load sensor.

MEANS FOR SOLVING THE PROBLEMS

Technical means for achieving the object is a load sensor in which first and second electrode members oppositely placed make contact mutually to conduct electrically by application of a load and thereby the load is detected, and the load sensor is characterized by comprising an elastic tube in which at least a part of the circumferential segment is formed into a conductive portion having elasticity, the elastic tube being provided as the first electrode member and formed of elastic material, a center electrode member in which at least the outer circumferential portion has conductivity, the center electrode member being provided as the second electrode member and having a foldable elongated shape elongated in one direction and provided within the elastic tube, and an insulating linear member in which at least the outer circumferential portion is an elongated shape having insulation properties, the insulating linear member being wound spirally on the center electrode member at a predetermined winding distance.

The insulating linear member preferably comprises a first metal wire, and an insulating coat layer applied and formed to a surface of the first metal wire.

Also, the insulating linear member preferably comprises a first metal wire, and a resin coat formed by extrusion molding an insulating resin to a surface of the metal wire.

Further, the insulating linear member is preferably a string-shaped member or a fiber-shaped member formed of insulating material.

Also, the center electrode member preferably comprises a center member having a predetermined tensile strength and restoring properties to folding deformation and having an elongated shape in which at least the outer circumferential portion has elasticity, and a second conductive metal wire transversely wound spirally on the outer circumference of the center member.

Further, the center electrode member preferably further comprises a conductive coat layer made of conductive resin or conductive rubber provided so as to cover the outer circumferential surface of the center member from the upper portion of the second metal wire.

Also, the center electrode member is preferably constructed by twisting or bundling plural metal strands together.

Further, the center electrode member is preferably constructed by a single metal wire.

Also, the load sensor preferably further comprises an outer enclosure tube which is formed of elastic material and encloses the outside of the elastic tube.

Further, technical means for achieving the object is a pinch detection apparatus for detecting a pinch of foreign matter at the time when an opening portion switched by a switching member is closed by the switching member by load detection means provided in at least any one of the opening portion and the switching member, and the pinch detection apparatus is characterized in that the load sensor as defined in any of claims 1–9 is used as the load detection means.

Also, technical means for achieving the object is a load detection apparatus for detecting a load by load detection means placed in a two dimensional manner, and the load detection apparatus is characterized in that the plural load sensors placed in a two dimensional manner as defined in any of claims 1–9 are used as the load detection means.

Further, technical means for achieving the object is a load detection apparatus for detecting a load by load detection means placed in a two dimensional manner, and the load detection apparatus is characterized in that the load sensor bent and placed in a two dimensional manner as defined in any of claims 1–9 is used as the load detection means.

DETAILED DESCRIPTION OF THE PREFERRED EMBODIMENTS

Mode for Carrying out the Invention

Embodiment

Figure 1:
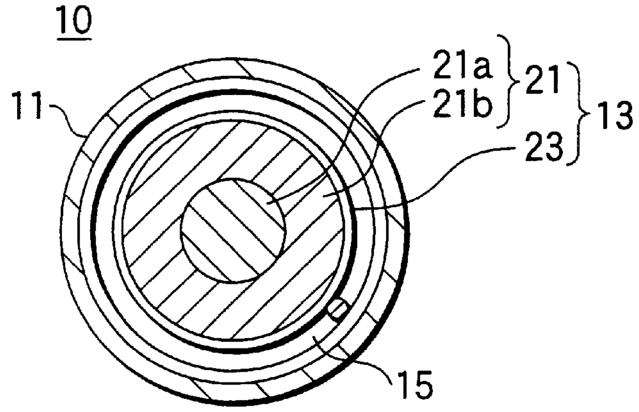
FIG. 1 is a sectional view of a load sensor according to one embodiment of the invention.

FIG. 1 is a sectional view of a load sensor according to one embodiment of the invention. As shown in FIG. 1, this load sensor 10 comprises an elastic conductive tube (elastic tube) 11, a center electrode member 13 and an insulating linear member 15.

As shown in FIG. 1, the elastic conductive tube 11 is formed of elastic material and at least a part of the circumferential segment is formed into a conductive portion having elasticity (here, the whole elastic conductive tube 11 is formed of elastic conductive material such as conductive rubber or elastic conductive resin and the whole circumferential segment is formed into a conductive portion).

Figure 2:
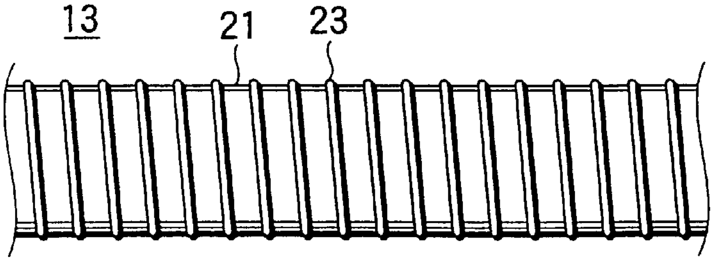
FIG. 2 is a side view of a center electrode member.
Figure 3:
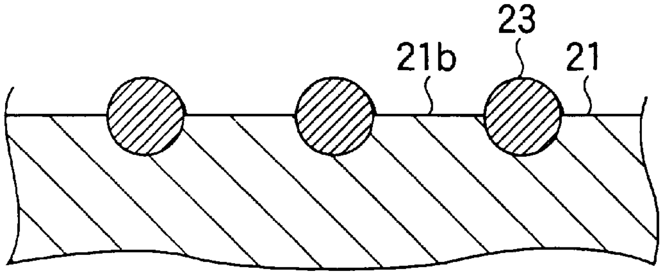
FIG. 3 is an enlarged sectional view of a main part of the center electrode member.

As shown in FIG. 1, the center electrode member 13 has a foldable elongated shape elongated in one direction and is provided within the elastic conductive tube 11. As shown in FIG. 2, this center electrode member 13 comprises a center member 21 which has a predetermined tensile strength and restoring properties to folding deformation and is susceptible to folding deformation of an elongated shape with circular cross section in which at least the outer circumferential portion has elasticity, and a conductive metal wire (second metal wire) 23 with a thin diameter transversely wound closely spirally at a predetermined pitch on the outer circumference of the center member 21. Nickel alloy, copper, copper alloy, nichrome, stainless steel, etc. are used as material of the metal wire 23. Here, the metal wire 23 is wound so that a part of a cross section of the metal wire (here, half moderately) is forced into the surface of the center member 21 for prevention of a position deviation as shown in FIG. 3.

As shown in FIG. 1, the center member 21 comprises a center reinforcing member (tension member) **21*a* having a high tensile strength and an elastic layer (here, elastic insulating layer) 21*b* made of elastic material (here, elastic insulating material) provided around the center reinforcing member 21*a* by extrusion molding. Material in which fibers (for example, aramid fibers) with a strong tensile strength are twisted together or are bundled is used as material of the center reinforcing member 21*a*. Fluorine rubber, silicone rubber, EPDM, etc. are used as elastic insulating material of the elastic insulating layer 21*b***.

Figure 4:
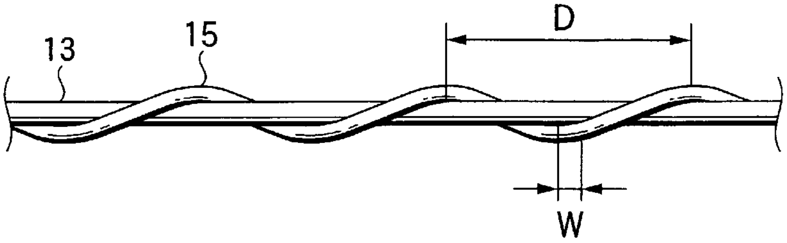
FIG. 4 is a diagram showing a state in which an insulating linear member is wound on the center electrode member.
Figure 5:
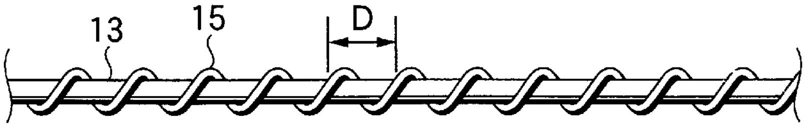
FIG. 5 is a diagram showing a state in which the insulating linear member is wound on the center electrode member.

In the insulating linear member 15, at least the outer circumferential portion has an elongated shape with insulation properties and in the embodiment, the insulating linear member 15 is constructed by comprising a metal wire (first metal wire) and an insulating coat layer formed by applying an insulating material such as enamel to a surface of the metal wire. Then, as shown in FIGS. 4 and 5, such an insulating linear member 15 is wound spirally on the center electrode member 13 at a predetermined winding distance D. Here, as shown in FIGS. 4 and 5, the winding distance D is constructed so that an adjustment can be made easily according to sensor sensitivity as described below.

Assembly of such a load sensor 10 is done by continuously winding the insulating linear member 15 on the outer circumference of the center electrode member 13 in a longitudinal direction of the center electrode member 13 by a winding machine and inserting the insulating linear member 15 along with the center electrode member 13 into the elastic conductive tube 11.

By such a configuration, it is constructed so that the center electrode member 13 (particularly, the metal wire 23) and the elastic conductive tube 11 are separated to be insulated electrically by the insulating linear member 15 in a state in which a load is not applied to the load sensor 10.

On the other hand, when a load with a predetermined strength or more is applied to the load sensor 10 and elastic deformation is performed so as to squeeze an internal cavity of the elastic conductive tube 11, it is constructed so that electrical contact between the elastic conductive tube 11 and the center electrode member 13 is allowed through a gap portion of the insulating linear member 15 wound spirally. In this load sensor 10, it is constructed so as to detect the presence or absence of application of a load by detecting the presence or absence of electrical conduction between this elastic conductive tube 11 and the center electrode member 13. Then, with release of the application of the load, the elastic conductive tube 11 returns to the original shape shown in FIG. 1 and the electrical contact between the elastic conductive tube 11 and the center electrode member 13 is released.

Incidentally, a lead wire for signal pullout is electrically connected to one of the ends of the elastic conductive tube 11 and the center electrode member 13.

Here, a thickness of the insulating linear member 15 (a width W with respect to a longitudinal direction of the center electrode member 13 (see FIG. 4) and a thickness with respect to a diameter direction of the center electrode member 13) and the winding distance D are set so that a load strength necessary in the case that elastic deformation is performed at the time of application of a load and the conductive portion of the elastic tube makes electrical contact with the center electrode member, namely sensor sensitivity becomes a desired level. For example, in an example of FIG. 4, the thickness (outer diameter) of the insulating linear member 15 is set to 0.6 mm and the winding distance D is set to about 15 mm, and in an example of FIG. 5, the thickness (outer diameter) of the insulating linear member 15 is set to 0.3 mm and the winding distance D is set to about 5 mm.

According to the embodiment as described above, there is a configuration in which the insulating linear member 15 is wound on the outer circumferential portion of the center electrode member 13 and the insulating linear member 15 is interposed between the elastic conductive tube 11 and the center electrode member 13, so that a structure is simple and also assembly can be done by inserting the wound insulating linear member 15 along with the center electrode member 13 into the elastic conductive tube 11 easily and smoothly and manufacture can be performed easily at low cost.

Also, since the insulating linear member 15 is interposed between the center electrode member 13 and the elastic conductive tube 11, even when bending and placing the load sensor 10 at a large curvature, there is no case that the center electrode member 13 accidentally makes contact with the elastic conductive tube 11 and false detection of a load occurs, and a function can be performed properly.

Further, sensor sensitivity can be adjusted easily by adjusting at least any one of a thickness of the insulating linear member 15 (at least one of a width W with respect to a longitudinal direction of the center electrode member 13 and a thickness with respect to a diameter direction of the center electrode member 13) and the winding distance D.

Also, since there is a configuration in which the insulating linear member 15 is wound spirally on the center electrode member 13 to be mounted, the insulating linear member 15 can be mounted securely on the center electrode member 13. As a result of this, there are provided improvements in reliability in which a winding shape of the insulating linear member 15 can be held securely and load detection sensitivity can be held constant without substantial position deviation or shape distortion of the insulating linear member 15 on the center electrode member 13 even when the load sensor 10 is bent or extended.

Further, since the insulating linear member 15 can be wound and mounted with accuracy and ease at a uniform winding distance, when a load detection target article abuts on the load sensor 10, there is substantially no case that the insulating linear member 15 becomes an obstacle and conduction between the elastic conductive tube 11 and the center electrode member 13 is blocked, and load detection can be performed surely even for the load detection target article of a small article and also the load detection can be performed even in any positions substantially continuously with respect to a longitudinal direction of the load sensor 10.

Also, since winding of the insulating linear member 15 can be performed continuously in arbitrary lengths substantially with respect to a longitudinal direction of the center electrode member 13 by a winding machine, long lengths of the load sensor 10 can be manufactured easily at low cost.

Further, since the insulating linear member 15 is formed by providing a metal wire as core material, a winding shape of the insulating linear member 15 is held by shape holding properties of the metal wire when the insulating linear member 15 is wound on the center electrode member 13. As a result of this, there can be provided a load sensor 10 in which the insulating linear member 15 can be fixed securely by only the winding without using fixing means such as adhesive and also a bending can be performed flexibly with strong toughness moderately with respect to bend deformation and ruggedness is provided.

Also, even when the center electrode member 13 and the insulating linear member 15 are cut halfway without performing special terminal processing such as adhesive fixing of the insulating linear member 15, the wound insulating linear member 15 is not released from the center electrode member 13 at the cut place and it is easy to handle.

Further, by spirally winding such an insulating linear member 15 on the center electrode member 13, toughness of the center electrode member 13 can be increased and insertion of the center electrode member 13 into the elastic conductive tube 11 can be performed easily and workability can be improved.

Also, when a lead wire for signal pullout is connected to the end of the center electrode member 13, by closely winding the insulating linear member 15 from the top of an electrical connection portion between the lead wire and the center electrode member 13, the electrical connection portion can be insulated from the elastic conductive tube 11 without providing a special insulating member.

Further, the center electrode member 13 is constructed by comprising the center member 21 which has a predetermined tensile strength and restoring properties to folding deformation and has an elongated shape in which at least the outer circumferential portion has elasticity, and the conductive metal wire 23 transversely wound spirally on the outer circumference of the center member 21, so that there can be provided a load sensor 10 which is able to be installed easily in correspondence with various installation forms with the load sensor 10 bent and deformed and also has a high mechanical strength and has high restoring properties to bending and has excellent resistance to shock.

Modified Example

In the embodiment, the insulating linear member 15 is constructed of an enamel wire in which a metal wire is coated with an insulating coat layer, but the insulating linear member 15 may be constructed of a coat electric wire formed by comprising a metal wire acting as core material and a resin coat formed by extrusion molding an insulating resin to a surface of the metal wire.

Also, as a further modified example of the insulating linear member 15, the insulating linear member 15 may be constructed of a string-shaped member or a fiber-shaped member formed of insulating material. In this case, since the insulating linear member 15 has a simple configuration, the insulating linear member 15 can be manufactured at low cost and cost of the load sensor 10 can be reduced.

Further, as a modified example of the center electrode member 13, there maybe further provided a conductive coat layer made of conductive resin or conductive rubber provided so as to cover the outer circumferential surface of the center member 21 from the upper portion of the metal wire 23. In this case, as compared with the case of winding the insulating linear member 15 directly from the upper portion of the metal wire 23 transversely wound, a contact area between the insulating linear member 15 and the center electrode member 13 and frictional force (engagement force to a position deviation) can be increased and a position deviation of the insulating linear member 15 on the center electrode member 13 can be prevented and as a result of that, a winding shape of the insulating linear member 15 can be held more surely.

Also, as a further modified example of the center electrode member 13, the center electrode member 13 may be constructed by twisting or bundling plural metal strands together. In this case, since the center electrode member 13 has a simple configuration, the center electrode member 13 can be manufactured at low cost and cost of the load sensor 10 can be reduced.

Also, as a furthermore modified example of the center electrode member 13, the center electrode member 13 may be constructed by a single metal wire. In this case, along with an advantage that the center electrode member 13 has a simple configuration, there is an advantage that the load sensor 10 can be held in a predetermined bend shape using shape holding properties of the center electrode member 13 since the center electrode member 13 is constructed by the single metal wire.

Figure 6:
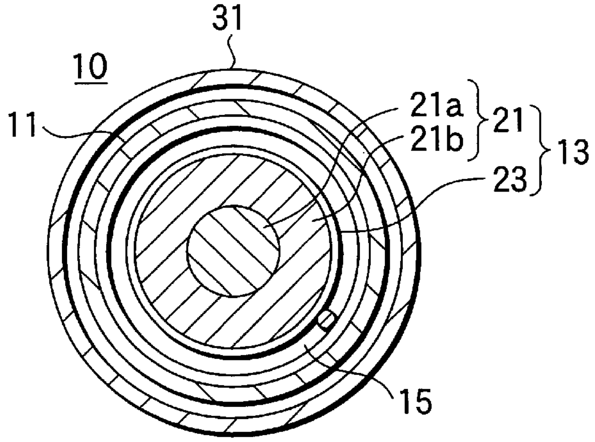
FIG. 6 is a sectional view showing a modified example of the load sensor of FIG. 1.

Further, as a modified example of the load sensor 10, as shown in FIG. 6, there may be further provided an outer enclosure tube 31 which is formed of elastic material and encloses the outside of the elastic conductive tube 11. In this case, since the outer enclosure tube 31 is further provided in the outside of the elastic conductive tube 11, the elastic conductive tube 11 and the center electrode member 13 which are a main body of the load sensor 10 can be protected by the outer enclosure tube 31.

Incidentally, a winding pitch of the insulating linear member 15 does not necessarily need to be constant and as required, close winding or rough winding is performed and changes can be made. For example, by performing the close winding, its portion can also be used as an insulating portion or as a fixed portion of the sensor 10. Also, by performing the rough winding, sensor sensitivity of its portion can be enhanced.

Application Example

Here, application examples of a load sensor 10 according to the embodiment and its modified example will be described with reference to FIGS. 7 to 9. Incidentally, the application examples of the load sensor 10 are not limited to the contents described herein since various uses are considered.

Figure 7:
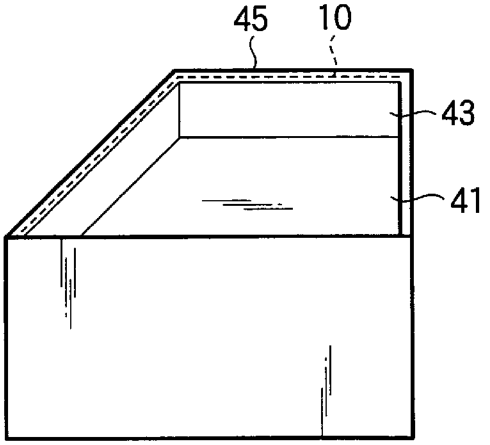
FIG. 7 is a diagram showing an installation form of the case that the load sensor of FIG. 1 is applied to a pinch detection apparatus of a power window apparatus of a vehicle.

In the application example shown in FIG. 7, the load sensor 10 is applied to a pinch detection apparatus of a power window apparatus of a vehicle. In this application example, as shown in FIG. 7, the load sensor 10 is installed in a window frame portion 45 of a window 43 switched by window glass (switching member) 41 driven by electric power as load detection means for pinch detection of foreign matter (it may be installed in the downstream end of a closing direction of the window glass 41 as another installation example).

Incidentally, here, the load sensor 10 is applied to the pinch detection apparatus of the power window apparatus of the vehicle, but the load sensor 10 may be applied to a pinch detection apparatus of a door or a sunroof of a vehicle, or a doorway of a building or an elevator.

Figure 8:
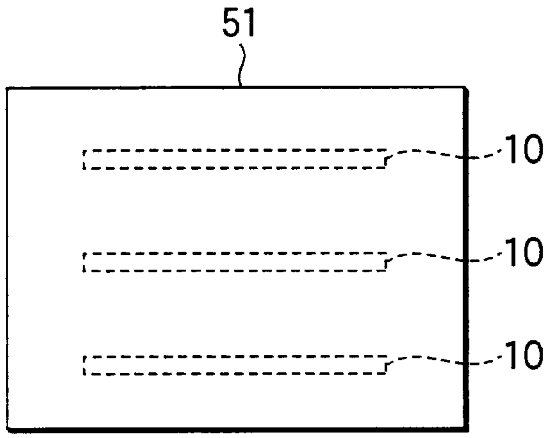
FIG. 8 is a diagram showing an installation form of the case that the load sensor of FIG. 1 is applied to a sheet-shaped load detection apparatus.
Figure 9:
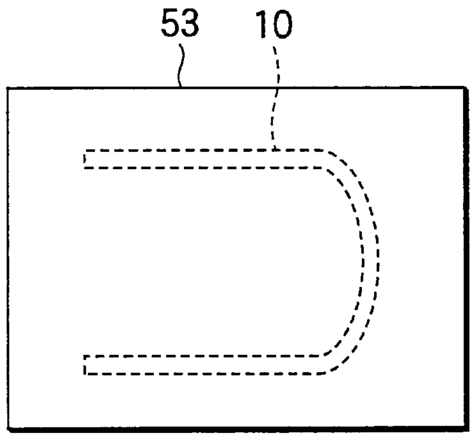
FIG. 9 is a diagram showing an installation form of the case that the load sensor of FIG. 1 is applied to a sheet-shaped load detection apparatus.
Figure 10:
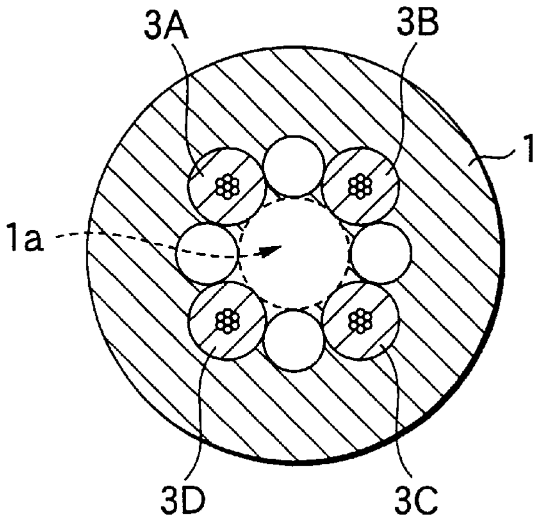
FIG. 10 is a sectional view of a conventional load sensor.

In the application examples shown in FIGS. 8 and 9, the load sensor 10 is applied to a sheet-shaped load detection apparatus. In the application example of FIG. 8, it is constructed so that plural load sensors 10 are placed on a sheet member 51 in a two dimensional manner and load detection is performed in a two dimensional manner by the plural load sensors 10. In the application example of FIG. 9, it is constructed so that a single load sensor 10 is bent in a two dimensional manner (here, "U" shape) and is placed on a sheet member 53 and load detection is performed in a two dimensional manner by this load sensor 10. Incidentally, in the modified examples shown in FIGS. 8 and 9, the load sensor 10 is placed on the sheet member 51, but the load sensor 10 may be placed so as to be sandwiched between two sheet members, or the load sensor 10 may be placed so as to be buried in a plate-shaped elastic substance formed of elastic material such as sponge or rubber.

Effect of the Invention

According to the invention as defined in claims 1–9, there is a configuration in which an insulating linear member is wound on the outer circumferential portion of a center electrode member and the insulating linear member is interposed between an elastic tube and the center electrode member, so that a structure is simple and also assembly can be done by inserting the wound insulating linear member along with the center electrode member into the elastic tube easily and smoothly and manufacture can be performed easily at low cost.

Also, since the insulating linear member is interposed between the center electrode member and the elastic tube, even when bending and placing a load sensor at a large curvature, there is no case that the center electrode member accidentally makes contact with a conductive portion of the elastic tube and false detection of a load occurs, and a function can be performed properly.

Further, a load strength necessary in the case that elastic deformation is performed at the time of application of a load and the conductive portion of the elastic tube makes electrical contact with the center electrode member, namely sensor sensitivity can be adjusted easily by adjusting at least any one of a thickness of the insulating linear member and a winding distance.

Also, since there is a configuration in which the insulating linear member is wound spirally on the center electrode member to be mounted, the insulating linear member can be mounted securely on the center electrode member. As a result of this, there are provided improvements in reliability in which a winding shape of the insulating linear member can be held securely and load detection sensitivity can be held constant without substantial position deviation or shape distortion of the insulating linear member on the center electrode member even when the load sensor is bent or extended.

Further, since the insulating linear member can be wound and mounted with accuracy and ease at a uniform winding distance, when a load detection target article abuts on the load sensor, there is substantially no case that the insulating linear member becomes an obstacle and conduction between the conductive portion of the elastic tube and the center electrode member is blocked, and load detection can be performed surely even for the load detection target article of a small article and also the load detection can be performed even in any positions substantially continuously with respect to a longitudinal direction of the load sensor.

Also, since winding of the insulating linear member can be performed continuously in arbitrary lengths substantially with respect to a longitudinal direction of the center electrode member by a winding machine, long lengths of the load sensor can be manufactured easily at low cost.

According to the invention as defined in claims 2 and 3, since the insulating linear member is formed by providing a metal wire as core material, a winding shape of the insulating linear member is held by shape holding properties of the metal wire when the insulating linear member is wound on the center electrode member. As a result of this, there can be provided a load sensor in which the insulating linear member can be fixed securely by only the winding without using fixing means such as adhesive and also a bending can be performed flexibly with strong toughness moderately with respect to bend deformation and ruggedness is provided.

Also, even when the center electrode member and the insulating linear member are cut halfway without performing special terminal processing such as adhesive fixing of the insulating linear member, the wound insulating linear member is not released from the center electrode member at the cut place and it is easy to handle.

Further, by spirally winding such an insulating linear member on the center electrode member, toughness of the center electrode member can be increased and insertion of the center electrode member into the elastic tube can be performed easily and workability can be improved.

Also, when a lead wire for signal pullout is connected to the end of the center electrode member, by closely winding the insulating linear member from the top of an electrical connection portion between the lead wire and the center electrode member, the electrical connection portion can be insulated from the elastic tube without providing a special insulating member.

According to the invention as defined in claim 4, since the insulating linear member has a simple configuration, the insulating linear member can be manufactured at low cost and cost of the load sensor can be reduced.

According to the invention as defined in claim 5, the center electrode member is constructed by comprising the center member which has a predetermined tensile strength and restoring properties to folding deformation and has an elongated shape in which at least the outer circumferential portion has elasticity, and the second conductive metal wire transversely wound spirally on the outer circumference of the center member, so that there can be provided a load sensor which is able to be installed easily in correspondence with various installation forms with the load sensor bent and deformed and also has a high mechanical strength and has high restoring properties to bending and has excellent resistance to shock.

According to the invention as defined in claim 6, since the center electrode member is provided with a conductive coat layer made of conductive resin or conductive rubber provided so as to cover the outer circumferential surface of the center member from the upper portion of the metal wire, as compared with the case of winding the insulating linear member directly from the upper portion of the second metal wire transversely wound, a contact area between the insulating linear member and the center electrode member and frictional force (engagement force to a position deviation) can be increased and a position deviation of the insulating linear member on the center electrode member can be prevented and as a result of that, a winding shape of the insulating linear member can be held more surely.

According to the invention as defined in claim 7, since the center electrode member has a simple configuration, the center electrode member can be manufactured at low cost and cost of the load sensor can be reduced.

According to the invention as defined in claim 8, since the center electrode member has a simple configuration, the center electrode member can be manufactured at low cost and cost of the load sensor can be reduced.

Also, since the center electrode member is constructed by the single metal wire, there is an advantage that the load sensor can be held in a predetermined bend shape using shape holding properties of the center electrode member.

According to the invention as defined in claim 9, since the outer enclosure tube is further provided in the outside of the elastic tube, the elastic tube and the center electrode member which are a main body of the load sensor can be protected by the outer enclosure tube.

According to the invention as defined in claim 10, since the load sensor as defined in any of claims 1–9 is used as the load detection means, there can be provided a low-cost pinch detection apparatus with high reliability capable of detecting a pinch surely with high sensitivity.

According to the invention as defined in claim 11, since the plural load sensors placed in a two dimensional manner as defined in any of claims 1–9 are used as the load detection means, there can be provided a low-cost load detection apparatus with high reliability capable of detecting a load surely with high sensitivity.

According to the invention as defined in claim 12, since the load sensor bent and placed in a two dimensional manner as defined in any of claims 1–9 is used as the load detection means, there can be provided a low-cost load detection apparatus with high reliability capable of detecting a load surely with high sensitivity.

What is claimed is:

1. A load sensor in which first and second opposing electrode members make contact mutually to conduct electrically by application of a load, so as to detect the load, said load sensor comprising:

an elastic tube, in which, at least a part of the circumferential segment of the tube is formed into a conductive portion having elasticity, said elastic tube being provided as said first electrode member and formed of elastic material, a center electrode member, in which, at least the outer circumferential portion has conductivity, said center electrode member provided as said second electrode member and having a foldable elongated shape that is elongated in one direction and provided within said elastic tube, and an insulating linear member, in which, at least the outer circumferential portion is an elongated shape having insulation properties, said insulating linear member being wound spirally about said center electrode member at a predetermined winding distance.

2. The load sensor as defined in claim 1, wherein said insulating linear member includes:

a first metal wire, and an insulating coat layer applied and formed to a surface of said first metal wire.

3. The load sensor as defined in claim 1, wherein said insulating linear member includes:

a first metal wire, and a resin coat formed by extrusion molding an insulating resin to a surface of said first metal wire.

4. The load sensor as defined in claim 1, wherein said insulating linear member is selected from a group of a string-shaped member and a fiber-shaped member formed of insulating material.

5. The load sensor as defined in claim 1, wherein said center electrode member includes:

a center member having a predetermined tensile strength and restoring properties to folding deformation, and having an elongated shape in which at least the outer circumferential portion has elasticity, and a second conductive metal wire transversely wound spirally on the outer circumference of said center member.

6. The load sensor as defined in claim 5, wherein said center electrode member, further comprises:

a conductive coat layer made of conductive resin or conductive rubber provided so as to cover the outer circumferential surface of said center member from the upper portion of said second metal wire.

7. The load sensor as defined in claim 1, wherein said center electrode member is constructed by twisting or bundling plural metal strands together.

8. The load sensor as defined in claim 1, wherein said center electrode member is constructed by a single metal wire.

9. The load sensor as defined in claim 1, further comprising:

an outer enclosure tube which is formed of elastic material and encloses the outside of said elastic tube.

10. A pinch detection apparatus for detecting a pinch of foreign matter at the time when an opening portion, switched by a switching member, is closed by said switching member, by the load sensor according to claim 1, provided in at least any one of the opening portion and said switching member.

11. A load detection apparatus for detecting a load by the load sensor according to claim 1, placed in a two dimensional manner, wherein said plural load sensors are placed in a two dimensional manner.

12. The load detection apparatus for detecting a load by the load sensor according to claim 1, placed in a two dimensional manner, wherein said load sensor is bent and placed in a two dimensional manner.

* * * * *